(12) United States Patent
Oh et al.

(10) Patent No.: US 8,917,974 B2
(45) Date of Patent: Dec. 23, 2014

(54) DIGITAL BROADCASTING RECEIVER FOR PROGRAMMING RECORDING OF BROADCASTING PROGRAM AND METHOD THEREOF

(75) Inventors: Seong Oh, Seoul (KR); Eun-Kyung Kwak, Seoul (KR)

(73) Assignee: Humax Co., Ltd., Seongnam-Si (KR)

( * ) Notice: Subject to any disclaimer, the term of this patent is extended or adjusted under 35 U.S.C. 154(b) by 1460 days.

(21) Appl. No.: 11/872,132

(22) Filed: Oct. 15, 2007

(65) Prior Publication Data
US 2008/0199149 A1 Aug. 21, 2008

(30) Foreign Application Priority Data
Feb. 20, 2007 (KR) .................. 10-2007-0017121

(51) Int. Cl.
*H04N 9/80* (2006.01)
*H04N 5/76* (2006.01)
*H04N 5/782* (2006.01)

(52) U.S. Cl.
CPC ..................... *H04N 5/782* (2013.01)
USPC ............ 386/251; 386/248; 386/249; 386/291

(58) Field of Classification Search
CPC ....................................... H04N 9/797
USPC ................ 386/239–262, 291–299
See application file for complete search history.

(56) References Cited

U.S. PATENT DOCUMENTS

| | | | | |
|---|---|---|---|---|
| 5,987,210 A | * | 11/1999 | Iggulden et al. | 386/239 |
| 6,549,715 B1 | * | 4/2003 | Sasaki | 386/230 |
| 7,269,330 B1 | * | 9/2007 | Iggulden | 386/248 |
| 2002/0080277 A1 | | 6/2002 | Kida et al. | 348/553 |
| 2002/0174430 A1 | * | 11/2002 | Ellis et al. | 725/46 |
| 2003/0014768 A1 | * | 1/2003 | Ishihara et al. | 725/133 |
| 2003/0016944 A1 | * | 1/2003 | Kato | 386/46 |
| 2005/0074226 A1 | * | 4/2005 | Horiuchi | 386/52 |
| 2005/0223403 A1 | * | 10/2005 | Suito et al. | 725/32 |
| 2006/0177197 A1 | * | 8/2006 | Nakamura et al. | 386/83 |
| 2006/0271980 A1 | | 11/2006 | Mankovitz | 725/90 |
| 2007/0179786 A1 | * | 8/2007 | Masaki et al. | 704/270 |

FOREIGN PATENT DOCUMENTS

| | | | |
|---|---|---|---|
| EP | 1 193 973 A2 | 4/2002 |
| EP | 1 357 748 A2 | 10/2003 |
| EP | 1 505 832 A1 | 2/2005 |

(Continued)

OTHER PUBLICATIONS

Korean Office Action dated Mar. 24, 2008.

(Continued)

*Primary Examiner* — Hung Dang
(74) *Attorney, Agent, or Firm* — Ked & Associates, LLP

(57) ABSTRACT

A digital broadcasting receiver, programming a recording a broadcast program, and a method thereof are disclosed. The digital broadcasting receiver can register a programmed channel including one or more channels, stores broadcast data received from the programmed channel as a programmed-recording program in accordance with a predetermined criterion, and stores a next programmed-recording program to replace the stored programmed-recording program if the programmed-recording program is completely stored and broadcast data corresponding to the next programmed-recording program is received. With the present invention, it becomes possible to program a recording although no information on a broadcast program is available, to view a currently-broadcast program from the beginning regardless of when the TV is turned on, and program a recording to exclude commercial programs.

21 Claims, 6 Drawing Sheets

(56) References Cited

FOREIGN PATENT DOCUMENTS

| | | |
|---|---|---|
| JP | 2001-309268 | 11/2001 |
| JP | 2002-112197 | 4/2002 |
| JP | 2002-185912 | 6/2002 |
| JP | 2005-191963 | 7/2005 |
| JP | 2005-252764 | 9/2005 |
| JP | 2006-270974 | 10/2006 |
| KR | 10-2003-0042121 A | 5/2003 |
| KR | 10-2004-0051429 A | 6/2004 |

OTHER PUBLICATIONS

European Search Report dated Jan. 8, 2010 for Application No. 07 019 848.6.

Japanese Office Action dated Jul. 14, 2007, for JP2007-290941.

* cited by examiner

DIGITAL BROADCASTING RECEIVER FOR PROGRAMMING RECORDING OF BROADCASTING PROGRAM AND METHOD THEREOF

CROSS-REFERENCE TO RELATED PATENT APPLICATIONS

This application claims the benefit of Korean Patent Application No. 10-2007-0017121, filed on Feb. 20, 2007, in the Korean Intellectual Property Office, the disclosure of which is incorporated herein in its entirety by reference.

BACKGROUND OF THE INVENTION

1. Field of the Invention

The present invention relates to programming a recording of a broadcast program. More specifically, the present invention relates to a digital broadcasting receiver for programming a recording of a digital broadcast program and a method thereof.

2. Description of the Related Technology

For the recording of a broadcast program transmitted from a broadcasting station, a personal video recorder (referred to as PVR, hereinafter) equipped with a hard disk drive (referred to as HDD, hereinafter) has been conventionally used.

The PVR records digital and analog broadcast signals, received through a television set, in the HDD, which is a storage device, and plays back the signals by use of a file playback method that is used in a computer, for example. The PVR is equipped with a central processing unit (CPU), a memory chip, in which an operating system and playback software are installed, and an HDD.

Typically, the PVR uses a file for time shift recording (TSR), which repeatedly stores the broadcast data in time units. Because of this, only a portion of certain broadcast program may be stored, making a user unable to watch the complete program.

In other generally-used programmed recording technologies besides the TSR, the user had to register information for programmed recording, such as the name of the broadcasting station, the broadcasting channel, and the recording time, obtained through an electronic program guide (EPG), newspaper, and magazine.

Such programmed recording methods, however, required the user to collect the information on the broadcast program and program the recording information everyday.

SUMMARY OF CERTAIN INVENTIVE ASPECTS

The present invention provides a method for programming a recording of a desired broadcast program without exact information on the broadcast program and a digital broadcasting receiver executing the method.

The present invention also provides a digital broadcasting receiver and a method for programming a recording that allow the user to watch the currently broadcast program of a programmed channel from the beginning of the program regardless of when the user turns on the TV.

The present invention also provides a digital broadcasting receiver and a method for programming a recording that exclude commercials from a broadcast program during the programmed recording.

An aspect of the present invention features a method of programming a recording in a digital broadcasting receiver. The method of programming a recording in accordance with an embodiment of the present invention includes the steps of: registering a programmed channel including one or more channels; storing broadcast data received from the programmed channel as a programmed-recording program in accordance with a predetermined criterion; and storing a next programmed-recording program to replace the stored programmed-recording program if the programmed-recording program is completely stored and broadcast data corresponding to the next programmed-recording program is received.

The predetermined criterion can include at least one broadcast program unit or at least one broadcast program unit, the programmed recording time of which is restricted.

If playing back of broadcast data from one channel of the programmed channel is requested, the broadcast data stored as the programmed-recording program is played back from the beginning in accordance with a selection by a user.

If the programmed-recording program is not played back from the beginning, it can be selected whether to continue or stop recording the programmed-recording program.

If the programmed channel, on which the programmed-recording program is being played back, is changed to another channel, it can be selected whether to continue or stop recording the programmed-recording program which is being played back on the programmed channel, If the programmed-recording program is continued to be recorded, a portion corresponding to a point where the programmed-recording program is changed can be clipped.

The method can also include cancelling one or more channels of the programmed channel and registering another channel as the programmed channel.

If an event of the broadcast data received from the programmed channel is changed and the event of the broadcast data is changed again within n minutes, broadcast data stored for the n minutes can be deleted.

Here, the n can be between 0.1 and 10.

The method can also include detecting a commercial program by using commercial program identification information included in the broadcast data and deleting broadcast data corresponding to the detected commercial program.

Another aspect of the present invention features a digital broadcasting receiver. The digital broadcasting receiver in accordance with an embodiment of the present invention includes: a control unit, registering one or more channels as a programmed channel, storing broadcast data received from the programmed channel as a programmed-recording program in accordance with a predetermined criterion, and storing a next programmed-recording program to replace the stored programmed-recording program if the programmed-recording program is completely stored and broadcast data corresponding to the next programmed-recording program is received; and a storage unit, storing broadcast data corresponding to the programmed-recording program and channel information registered as the programmed channel.

The predetermined criterion can include at least one broadcast program unit or at least one broadcast program unit, the programmed recording time of which is restricted.

The digital broadcasting receiver can also include a user interface for allowing a user to select whether broadcast data stored as the programmed-recording program is to be played back from the beginning, if playing back of broadcast data from one channel of the programmed channel is requested.

If the programmed-recording program is not played back from the beginning, the user can select through the user interface whether to continue or stop recording the programmed-recording program.

If the programmed channel, on which the programmed-recording program is being played back, is changed to another channel, the control unit can select whether to continue or stop recording the programmed-recording program which is being played back on the programmed channel.

If continued recording of the programmed-recording program is selected, the control unit can clip a portion corresponding to a point where the programmed-recording program is changed.

The control unit can cancel one or more channels of the programmed channel and register another channel as the programmed channel.

If an event of the broadcast data received from the programmed channel is changed and the event of the broadcast data is changed again within n minutes, the control unit can delete broadcast data stored for the n minutes.

Here, the n can be between 0.1 and 10.

The control unit can detect a commercial program by using commercial program identification information included in the broadcast data and delete broadcast data corresponding to the detected commercial program.

DESCRIPTION OF CERTAIN INVENTIVE EMBODIMENTS

Figure 1:
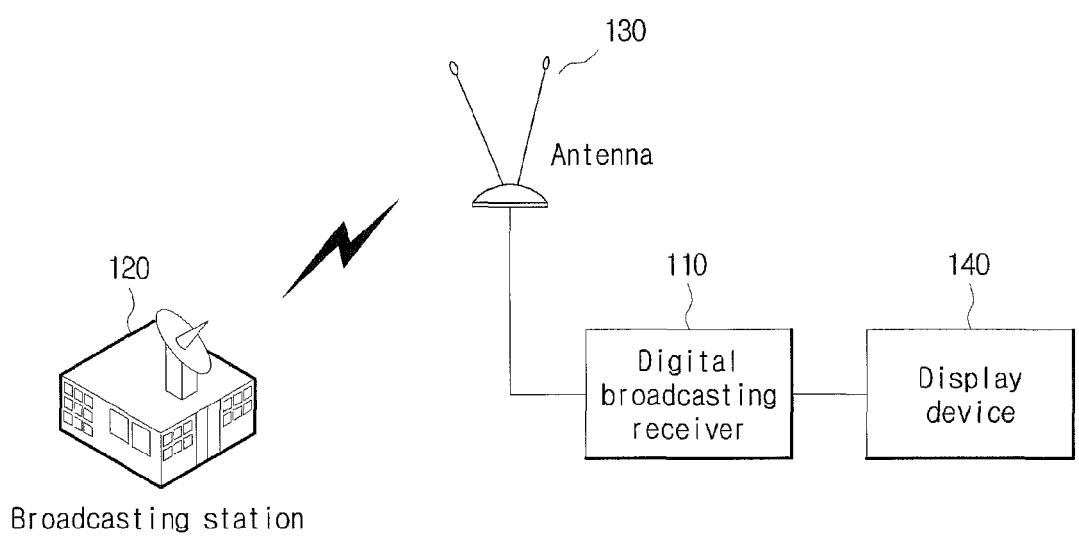
FIG. 1 shows a brief diagram of an entire system for providing a method of programming a recording in a digital broadcasting receiver in accordance with an embodiment of the present invention.

Hereinafter, some embodiments will be described in detail with reference to the accompanying drawings. Identical or corresponding elements will be given the same reference numerals, regardless of the figure number, and any redundant description of the identical or corresponding elements will not be repeated.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

FIG. 1 is a brief diagram showing an entire system for providing a method of programming a recording in a digital broadcasting receiver in accordance with an embodiment of the present invention.

Referring to FIG. 1, a digital broadcasting receiver 110, such as a settop box (STB) for receiving a digital satellite broadcast program, can be connected to and accessed by an antenna 130, which is connected to a broadcasting station 120, and a display device 140, such as a television set.

The broadcasting station 120 can be any kind of broadcasting station, including a ground wave broadcasting station, a cable broadcasting station, and a satellite broadcasting station, which provides broadcasting programs. The broadcast program from the broadcasting station 120 is received by the digital broadcasting receiver 110 through one or more of the ground wave, cable, and satellite.

The antenna 130 is for receiving a digital satellite broadcast program broadcast through a broadcasting satellite, if receiving a satellite broadcast program, for example. The antenna 130 receives a digital satellite broadcast program, which is broadcast by a transponder, which receives a transmission radio wave transmitted by a ground broadcasting station 120 and then amplifies the radio wave inside the satellite and re-transmits the radio wave to the ground, and outputs the digital satellite broadcast program to the digital broadcasting receiver 110.

The digital broadcasting receiver 110 can receive broadcasting signals through the ground wave, cable, and satellite, and select a variety of programs among the broadcasting signals. The digital broadcasting receiver 110 selects the broadcasting channel and outputs the video/audio data of the selected channel to the display device 140 such as a television set.

After the digital broadcasting receiver 110 restores and signal-processes the digital broadcast program of received transport streams to original video and audio signals, the digital broadcasting receiver 110 outputs and displays the video and audio signals through the television set to allow the user to watch a desired digital broadcast program.

Figure 2:
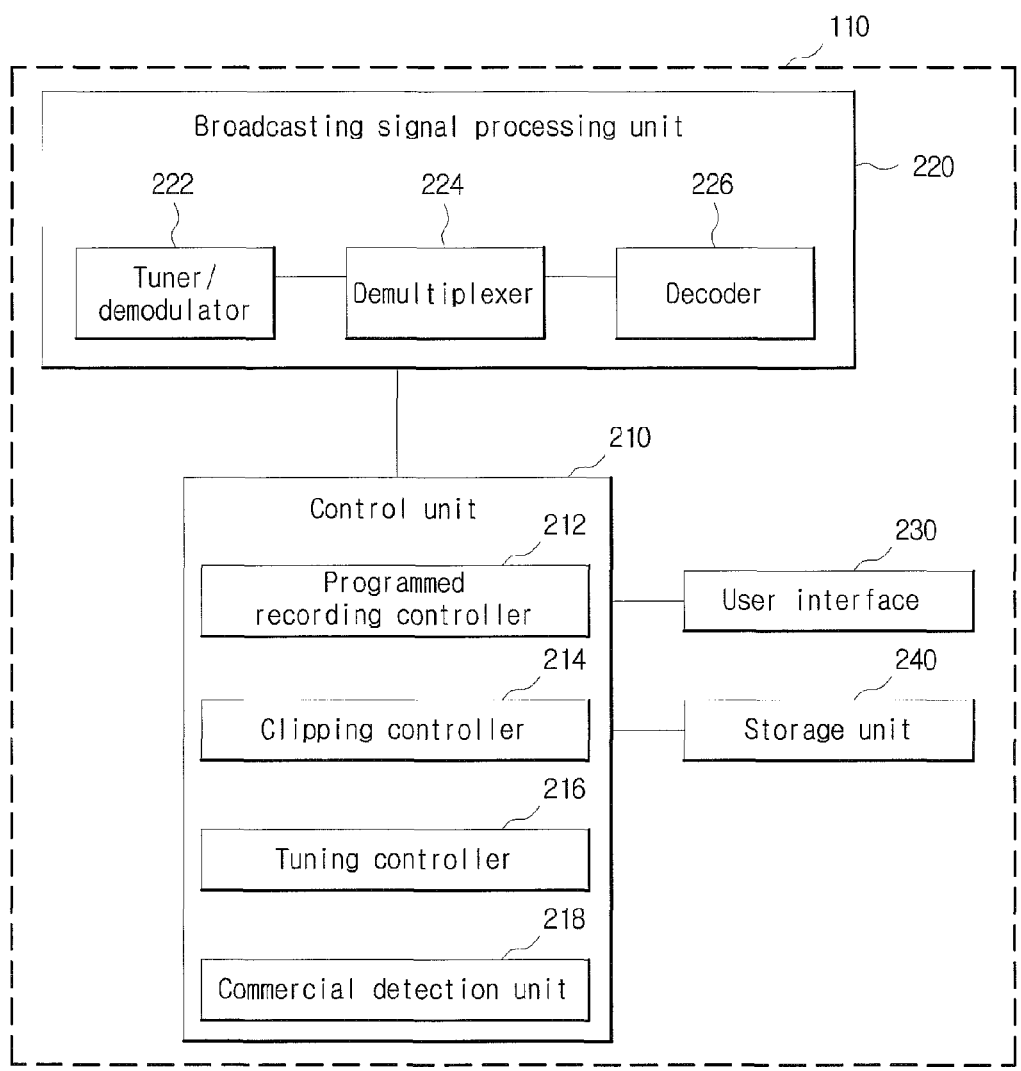
FIG. 2 shows a block diagram of an inside of a digital broadcasting receiver that is applied with the method of programming the recording in accordance with an embodiment of the present invention.

FIG. 2 is a block diagram showing the internal structure of a digital broadcasting receiver applied with a method of programming a recording in accordance with an embodiment of the present invention.

Referring to FIG. 2, the digital broadcasting receiver 110 in accordance with this embodiment includes a control unit 210, a broadcasting signal processing unit 220, a user interface 230, a storage unit 240, and a commercial detection unit 218.

The control unit 210 can include a programmed recording controller 212 and a clipping controller 214. The broadcasting signal processing unit 220 can include a tuner/demodulator 222, a demultiplexer 224, and a decoder 226.

The tuner/demodulator 222 responds to a tuning control signal provided by a tuning controller 216 to tune to a channel that the user registered to program a recording. That is, audio and video packet data for a broadcast program of a particular channel are extracted from broadcasting signals received through the antenna 130. The extracted audio and video packet data are restored to transmission streams through a series of processes, including transformation, demodulation, and error-correction to an intermediate frequency, and are delivered to the demultiplexer 224.

Then, the demultiplexer 224 separates the audio packet data and the video packet data from the transmission streams and delivers the data to the decoder 226. The decoder 226 decodes the audio packet data and the video packet data and outputs the data to an output unit (not shown) such as a speaker and an LCD.

The user interface 230 includes an input unit (not shown), such as a remote controller or a key matrix, which supplies key input signals for programmed recording. The user interface 230 provides to the control unit 210 commands to start or stop the programmed recording that are received from the input unit.

The storage unit 240 can be stored with programmed recording information, such as a programmed channel and programmed recording time, registered by the control of the control unit 210. The storage unit 240 can be also stored with programmed-recording program including the program-recorded audio/video data.

The storage unit 240 can be, for example, a hard disk drive (HDD), which is a high-capacity storage medium. In another embodiment of the present invention, the digital broadcasting receiver 110 may substitute a temporary server, coupled through a network (e.g., the Internet) or a local area network (LAN), as the storage unit 240, without using the actual storage unit 240.

The control unit 210 controls the overall operation of the digital broadcasting receiver 100 to supply the received broadcasting signal to the display device 140. In other words, the control unit 210 generates a tuning control signal to control the tuning of a channel, which is selected or programmed by the user, and generates a decoding control signal to control the decoding of compressed and encoded audio and video signals.

The programmed recording controller 212, particularly, is inputted with a programmed channel, programmed-recording program, or programmed recording start/end time and stores the information in the storage unit 240. At the programmed recording time, the programmed recording controller 212 executes the recording for the programmed channel.

In the present embodiment, the "programmed recording" refers to a function of recording the currently broadcast program of a channel by the control of the control unit 210 in case a recording command for the program of the particular channel is pre-configured. Additionally, the "programmed-recording program" refers to broadcast data recorded according to predetermined criteria. The predetermined criteria will be described later.

In another embodiment, the programmed recording controller 212 controls whether the programmed-recording program, which the user is watching, is to be played back from the beginning or whether the recording of the programmed-recording program is to be stopped, in response to a command by the user through the user interface 230.

The clipping controller 214 clips and memorizes the broadcasting signal of a channel when the user switches the channel, and later restores the clipped portion of the channel. The "clipping" refers to a function of recording or editing a portion that the user needs.

The tuning controller 216 controls the tuner/demodulator 222 to extract audio and video packet data for the broadcast program of a particular channel, in order to tune to the particular channel programmed by the user.

The commercial detection unit 218 detects commercials from the programmed-recording program. A variety of embodiments can be hypothesized for the detection of commercials.

In one of these embodiments, if an event of broadcast data received from the programmed channel is changed and the event is changed again after n minutes, and especially if the length of the program is 10 minutes or shorter, the program may be determined to be a commercial program. Therefore, by deleting the broadcast data corresponding to the commercial program from the storage unit 240, it can be made that only the main program is stored. Further details will be described later.

In another embodiment, the commercial program can be detected using commercial program identification information included in the broadcast data received from the programmed channel. Unnecessary broadcast data can be prevented from being stored by making the detected commercial program not recorded under the control of the control unit 210. Alternatively, the broadcast data received from the programmed channel can be first stored as a programmed-recording program and then detected and deleted by the commercial detection unit 218.

Here, the commercial identification information can be a broadcast program identification code included in the broadcasting signal. In case the identification code is included in the broadcasting signal by separating the main program and commercial program, the commercial detection unit 218 can depend on the transmission of the identification code to identify the commercial program.

The commercial identification information can be also program information displayed within the image frame of broadcast data. While a commercial program is received, an upper right corner of an image frame of the commercial program may be displayed with a small graphic or text disclosing the information of the main program to follow. The commercial detection unit 218 continuously monitors and compares a particular area of a series of temporally-connected image frames and detects the moment the graphic or text is turned off. While the detected graphic or text is continuously displayed, the commercial detection unit 218 can determine that the commercial program is being received.

Figure 3:
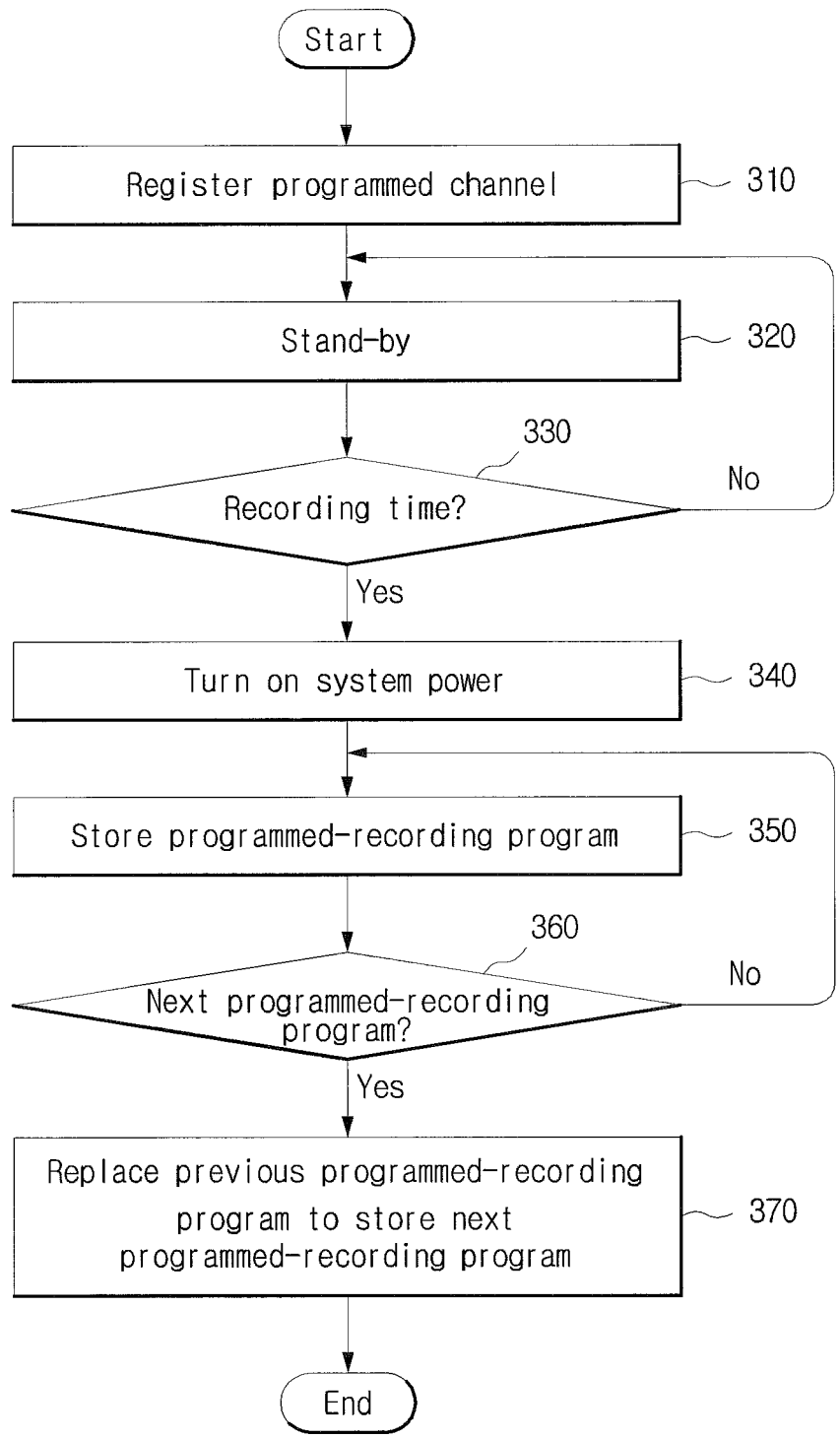
FIG. 3 shows a flowchart of the method of programming the recording in accordance with an embodiment of the present invention.

FIG. 3 is a flowchart showing a method of programming a recording in accordance with an embodiment of the present invention.

In step 310, the digital broadcasting receiver 110 sets one or more programmed channels. That is, if a programmed recording command, including channel information, is inputted by the user, the digital broadcasting receiver 110 registers the channel(s) as the programmed channel(s).

Here, the channel registered for programmed recording is referred to as "programmed channels," which can be more than one and can be set as many any the maximum number of channels that can be transmitted simultaneously.

In other words, if a plurality of channels are set, it is possible to record all programmed channels at the same time as well as to watch a program of one of the channels while simultaneously recording the rest of the programmed channels.

This is possible by having a plurality of tuner or a plurality of decoders. That is, the digital broadcasting receiver having a plurality of tuners can register m channels as programmed channels and make a recording for each tuner. Moreover, even if a product has one tuner only, a plurality of programs included in one transponder can be program-recorded as long as the product has a plurality of decoders.

Although FIG. 3 assumes that the programmed channels are preconfigured, the configuration and modification of the programmed channels can be made any time, including during the viewing. In other words, as long as the maximum number of programmed channels is not set, the programmed channels can be configured anytime. Moreover, even if the maximum number of programmed channels is set, one of the channels can be released to set another channel as a programmed channel.

In step 310, the digital broadcasting receiver 110 can also register a programmed recording time, such as a recording start time or a recording end time, for each of the registered programmed channel. For example, the user can register his favorite channels of 7 and 11, and set 7 p.m. as the recording start time in consideration of the time he gets off the work and 11 p.m. as the recording end time in consideration of his bed time.

Regardless of the on/off status of the system power of the digital broadcasting receiver 110, the control unit 210 can be in a stand-by state, in step 320, for programmed recording, that is, a micro computer (not shown) may be powered on.

Then, when it becomes the programmed recording start time in step 330, the system power of the digital broadcasting receiver 110 is turned on in step 340, and the tuner/demodulator 222 tunes to the programmed channel. If it is not a programmed recording time, the digital broadcasting receiver 110 may maintain the stand-by state of the step 320.

In step 350, the digital broadcasting receiver 110 some of the broadcast data, received from the channels registered as the programmed channels, as a programmed-recording program according to predetermined criteria.

Here, the "predetermined criteria" can be the number of programs designated by the user or the number of programs and recording time, that is, the number of programs with the maximum recording time.

In the present embodiment, the predetermined criteria are applied to the programmed recording in order to prevent the memory capacity from being unnecessarily too large because the price of the memory, such as the HDD, is proportional to the storage capacity.

The "programmed-recording program" used in this embodiment includes all of the one or more broadcast programs meeting the predetermined criteria. The programmed-recording program may or may not include the commercials, based on the user configuration. The method of excluding the commercials will be described later.

In the present embodiment, the predetermined criteria may include a single program. In other words, for one or more channels registered as the programmed channels, storing and deleting may be repeated for each broadcast program. In such a case, less memory capacity is needed than when a plurality of programs are designated as the programmed-recording program. Moreover, it is more convenient because the currently viewed broadcast program is played back, without having to select a broadcast program to play back among the plurality of programs.

Referring back to FIG. 3, the digital broadcasting receiver 110 verifies, in step 360, whether broadcast data successively received from the pertinent channel correspond to a next programmed-recording program.

Here, the "next programmed-recording program" refers to a broadcast program that is successively broadcast on the pertinent channel after the single programmed-recording program being stored is finished and that is to be stored as a programmed-recording program.

If the program received from the programmed channel is a next programmed-recording program, the digital broadcasting receiver 110 can record the next programmed-recording program, replacing the previously stored programmed-recording program, in step 370.

That is, the data corresponding to the programmed-recording program that is finished with recording can be deleted, and the next programmed-recording program can be recorded. Here, the digital broadcasting receiver 110 may delete all of the previously recorded programs or a portion of the previously recorded programs from the oldest or newest recording to correspond to the amount of the next programmed-recording program, thereby maintaining the recording to a fixed amount.

If there is sufficient amount of memory in the digital broadcasting receiver 110, it is, of course, possible to delete the data corresponding to the previously recorded programs after the next programmed-recording program is completely recorded. Alternatively, it is also possible that the previously recorded programs are not to be deleted.

The digital broadcasting receiver 110 can be also configured to predesignate a particular program to be programmed to be recorded, separately from recording the programmed-recording program by using the programmed channel. In this case, if the particular program designated to be programmed is identical to the above programmed-recording program, the pertinent broadcast program can be configured to be not deleted.

According to the embodiment as described above, the user can avoid checking every program schedule to program a recording because the digital broadcasting receiver 110 can store the programmed-recording program based on the predetermined criteria.

Moreover, the user can view the programmed-recording program from the beginning although the particular broadcast program of the programmed channel has started broadcasting already because the particular broadcast program is stored as the programmed-recording program. This will be further described with reference to FIG. 4.

Figure 4:
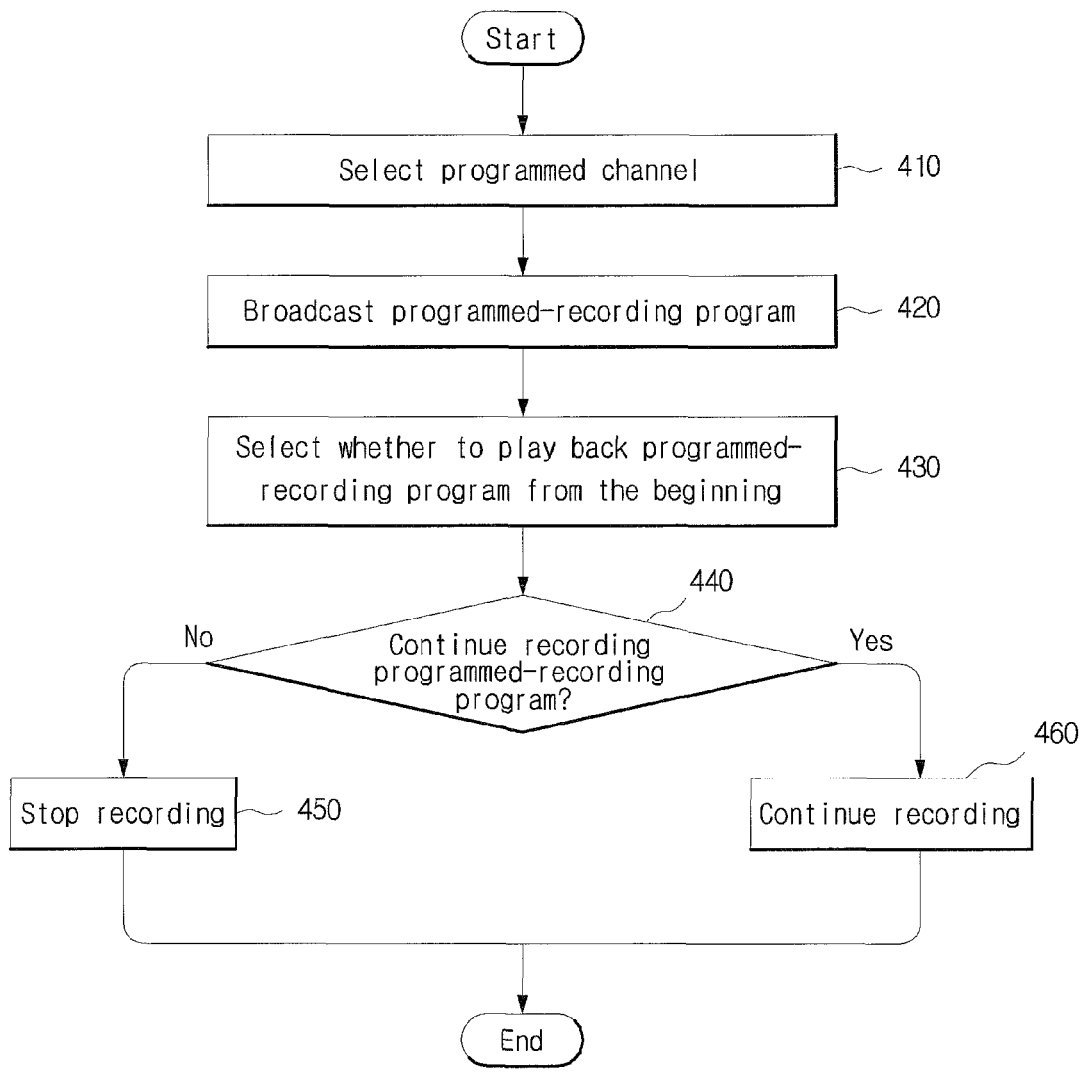
FIG. 4 shows a flowchart of playing back a programmed recording in accordance with an embodiment of the present invention.

FIG. 4 is a flowchart showing the process of playing back the programmed-recording program in accordance with an embodiment of the present invention.

In step 410, the digital broadcasting receiver 110 selects a programmed channel. Although the program broadcast on the programmed channel may not a programmed-recording program, this embodiment assumes that a program corresponding to the programmed-recording program is being broadcast, as shown in step 420.

According to this embodiment, the digital broadcasting receiver 110 is configured with a function of selecting whether the program currently played back should be played back from the beginning. Therefore, if the program being recorded as a programmed-recording program is played back at the moment, the digital broadcasting receiver 110 outputs, in step 430, a selection menu screen including a programmed-recording program playback message (e.g., "Play back from the beginning?"). Output of such a programmed-recording program playback message can be selectively made.

In this embodiment, "from the beginning" refers to playing back the broadcast data stored as the programmed-recording program from the beginning pursuant to the user's selection after the broadcast data is requested by the programmed channel to be played back.

If only one broadcast program is programmed to be recorded, "from the beginning" would refer to the beginning of the program that is currently played back. However, if a plurality of broadcast programs are programmed to be recorded, there can be a step of selecting a program to play back.

If the user inputs a command to either play back from the beginning or not play back from the beginning in response to the output of the message to play back the programmed-recording program, the digital broadcasting receiver 110 can output a message, in step 440, to have the user select whether recording of the programmed-recording program should be maintained. The user is allowed to choose to maintain the current recording even if he chooses not to play back from the beginning because he may later want to view the current broadcast program from the beginning.

If a command to stop recording is inputted by the user through the user interface 230, the digital broadcasting receiver 110 stops recording the current programmed-recording program in step 450. This way, the user can prevent an unwanted broadcast program from being recorded.

If, however, the command to stop recording is not inputted or the command to maintain recording is inputted, the digital broadcasting receiver 110 continues recording the programmed-recording program corresponding to the programmed channel, in step 460.

In this embodiment, recording of the currently viewed channel can be selectively programmed by outputting a message asking whether the recording should be maintained. However, if the user chooses not to play back the current broadcast program from the beginning, the programmed recording can be configured to be stopped immediately without outputting a message asking whether the programmed recording should be maintained.

Moreover, it is possible to set, cancel, or change the programmed channel describe above in this embodiment while the user is viewing the channel or the digital broadcasting receiver 110 is standing by.

In another embodiment of the present invention, it can be assumed that the user changes the channel to view another channel while viewing the programmed channel. That is, if the user requests a channel change by operating the digital broadcasting receiver 110 (for example, by controlling the remote control), the channel being displayed can be changed. This will be described in detail with reference to FIG. 5.

Figure 5:
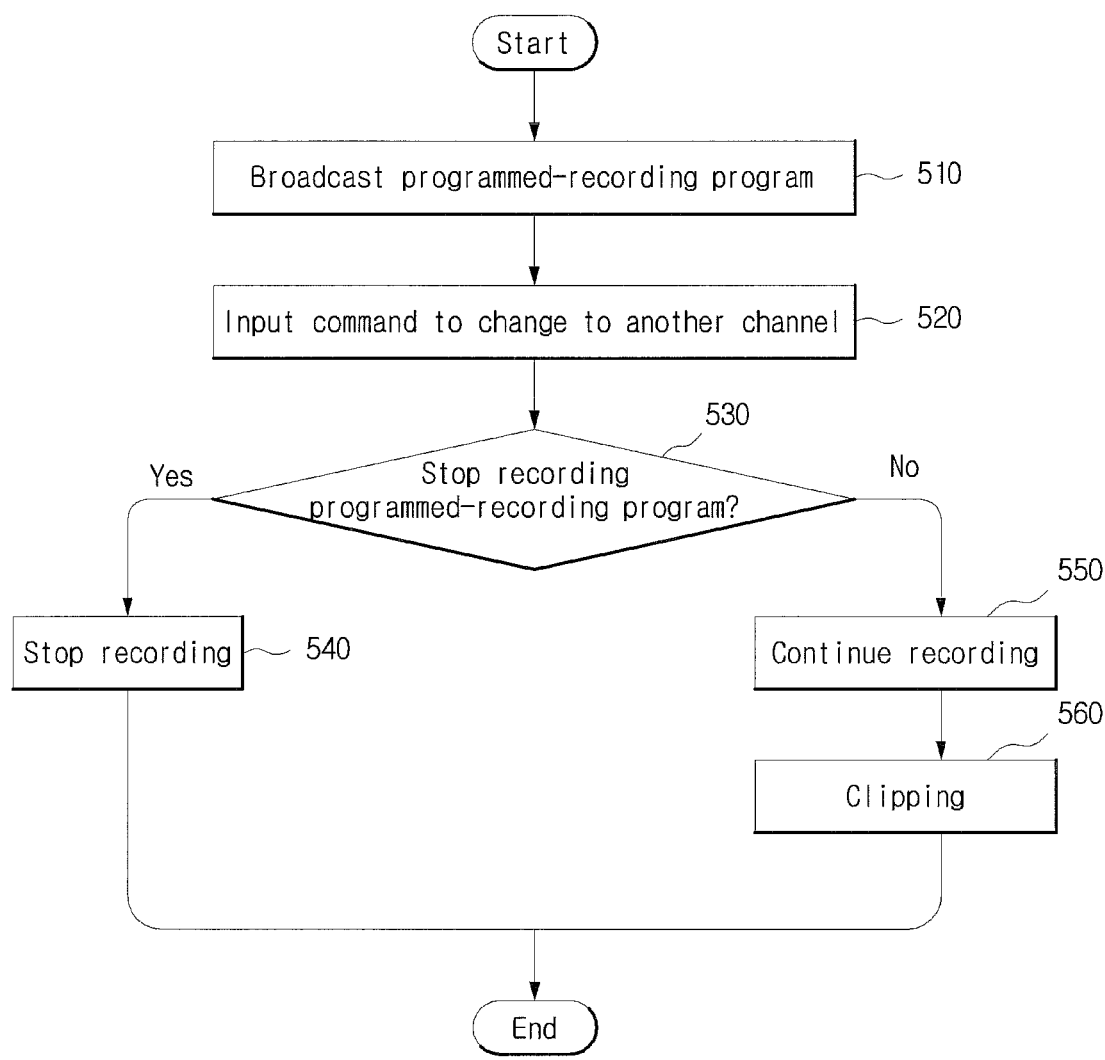
FIG. 5 shows a flowchart of a processing method based on a change of programmed channel in accordance with an embodiment of the present invention.

FIG. 5 is a flowchart showing a processing method based on a change of programmed channel in accordance with an embodiment of the present invention.

While the digital broadcasting receiver 110 is playing back a program, corresponding to a programmed channel, in step 510, a command to change to another channel can be inputted by the user through the user interface 230 in step 520.

The digital broadcasting receiver 110 having received this command outputs, in step 530, to the user through the selection menu screen a programmed recording stop message asking whether the existing programmed-recording program is to stop recording.

If the user chooses to stop recording in response to the programmed recording stop message, the digital broadcasting receiver 110 can stop recording the programmed-recording program before changing the channel, in step 540.

If the digital broadcasting receiver 110 continues recording the programmed-recording program before changing the channel, as in step 550, a step of clipping when changing channel can be added in step 560.

As described above, "clipping" refers to a function of recording or editing a portion that the viewer need, and it can be realized through, for example, soft-clipping and smoothing-clipping technologies.

In this embodiment, the broadcast signal of the place where the viewer changes the channel is clipped and restored later so that the viewer can watch from the place where he stopped watching earlier once he switches back to the original channel.

According to this embodiment, therefore, the programmed-recording program does not have to be played back from the beginning and the viewer does not have to repeat the same portion of a programmed-recording program.

Figure 6:
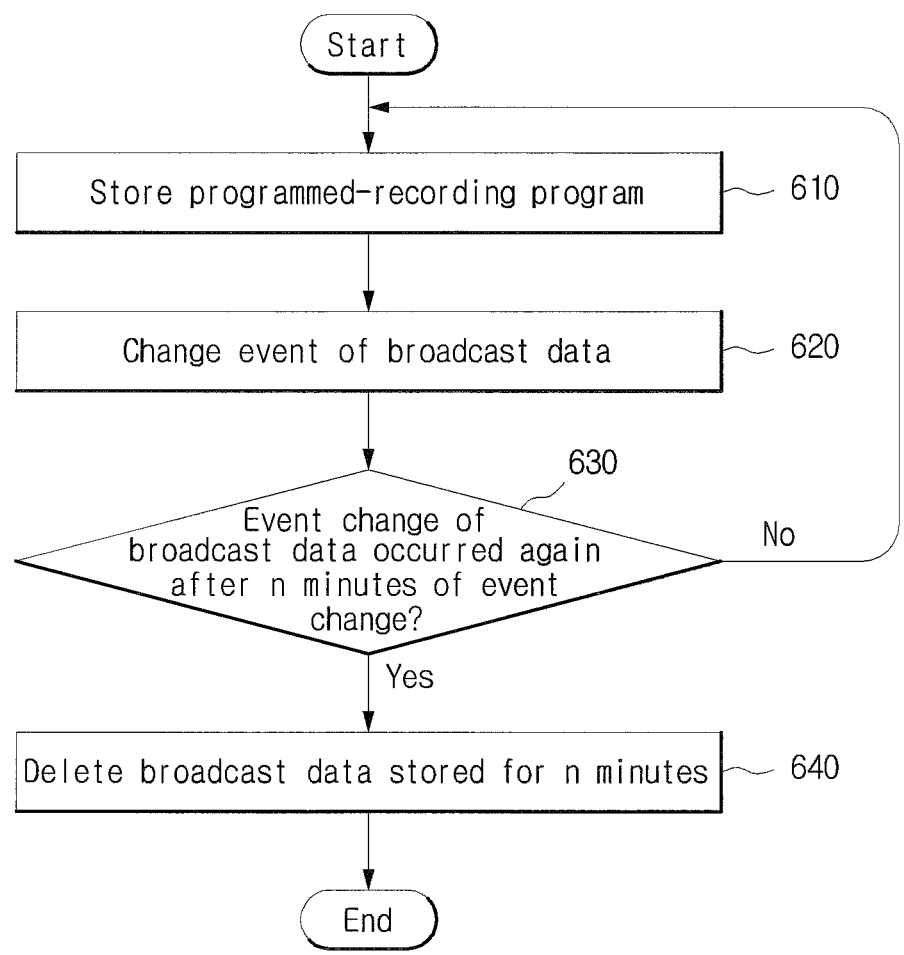
FIG. 6 shows a flowchart of a method of excluding commercials from the programmed recording in accordance with an embodiment of the present invention.

FIG. 6 is a flowchart showing a method of excluding commercials from the programmed recording in accordance with an embodiment of the present invention.

Referring to FIG. 6, the digital broadcasting receiver 110 stores, in step 610, broadcast data received from a programmed channel as a programmed-recording program corresponding to predetermined criteria.

In step 620, the commercial detection unit 218 recognizes that an event has been changed in broadcast data being received. Here, change in even refers to change in broadcast program. For example, if a drama titled "Jumong" is finished and a "commercial for XX cosmetic" is broadcast, it can be inferred that a change in the broadcast data has occurred. A change to another commercial can be viewed as a change in event.

The commercial detection unit 218 can check the time when the change in event occurs. Therefore, it is also possible to check in step 630 whether another change in event of the broadcast data has occurred after n minutes of a change in event of the broadcast data in the programmed-recording program.

Here, it is preferable that n is configured to be between 0.1 minutes (i.e., 10 seconds) and 10 minutes, considering the length of typical commercials. That is, since most commercials are shorter than 1 minute, a change in event within 10 minutes may be determined to be caused by a commercial. Therefore, the commercial detection unit 218 can distinguish commercial programs from the main broadcast program by checking the time of change in event between the broadcast data.

If the commercials are identified as described above, the digital broadcasting receiver 110 deletes, in step 640, the n minutes of stored broadcast data, which are determined to be of commercial programs, from the storage unit 240. Thus, unnecessary commercial programs are prevented from being recorded as a part of a programmed-recording program, and only the main program can be recorded.

Although not illustrated in the drawings, there can be a variety of embodiments that can program the recording without the commercials.

In another embodiment, if commercial programs are included in the digital broadcasting stream received from the broadcasting station 120, it would be possible that the commercial identification information, with which the commercial program can be identified, and the digital broadcasting receiver 110 record the main program only, excluding the commercial program, during the programmed recording. Alternatively, it would be possible that the broadcast data received to the programmed channel is first stored as a programmed-recording program and then the commercial detection unit 218 later detects and deletes the commercial program.

As described above, the commercial identification information can be a broadcasting program identification code included in broadcast signals, and the commercial detection unit 218 can distinguish the commercial program from the main program based on the presence of the identification code.

In yet another embodiment, the commercial identification information can be program information displayed within the image frame of broadcast data. When a commercial program is received, an upper right corner of an image frame of the commercial program may be displayed with a small graphic or text disclosing the information of the main program to follow. The commercial detection unit 218 continuously monitors and compares a particular area of a series of temporally-connected image frames and detects the moment the graphic or text is turned off. In case the detected graphic or text is continuously displayed, the commercial detection unit 218 can determine that the commercial program is being received.

In still another embodiment, it can be made that only the main program be recorded, by using a program schedule obtained from an EPG, newspaper or magazine. For example, if the main programs are broadcast only between 7:00 and 7:50 and between 8:00 and 8:50, these times can be programmed for recording, avoiding the commercials from being recorded.

Although certain embodiments of the present invention have been described, anyone of ordinary skill in the art to which the invention pertains should be able to understand that a very large number of permutations are possible without departing the spirit and scope of the present invention, which shall only be defined by the claims appended below.

What is claimed is:

1. A method of programming a recording in a digital broadcasting receiver, comprising:
    registering a programmed channel among one or more channels;
    storing broadcast data received from the programmed channel in a storage device as a programmed-recording program in accordance with a predetermined criterion;
    storing a next programmed-recording program in the storage device to replace the stored programmed-recording program if the programmed-recording program is completely stored and broadcast data corresponding to the next programmed-recording program is received;
    detecting a change in an event received in the broadcast data received in the programmed channel;
    determining a time period for a gap between the change in the event in the programmed channel and a subsequent change in the event in the same programmed channel; and
    deleting from the storage device a portion of the stored programmed-recording program or the next stored programmed-recording program corresponding to the gap when the time period is less than a prescribed amount of time.

2. The method of claim 1, wherein the predetermined criterion includes at least one broadcast program unit or at least one broadcast program unit, the programmed recording time of which is restricted.

3. The method of claim 1, further comprising:
    playing back the broadcast data stored as the programmed-recording program from the beginning in accordance with a request to playback the broadcast data stored as the programmed-recording program;
    changing the channel for play back in response to a request to change the channel; and
    recording or editing a portion of the broadcast data stored as the programmed-recording program corresponding to a point at which the channel is changed.

4. The method of claim 3, further comprising selecting whether to continue or stop recording the programmed-recording program, if the programmed-recording program is not played back from the beginning.

5. The method of claim 3, further comprising selecting whether to continue or stop recording the programmed-recording program which is being played back on the programmed channel, if the programmed channel, on which the programmed-recording program is being played back, is changed to another channel.

6. The method of claim 1, further comprising cancelling one or more channels of the programmed channel and registering another channel as the programmed channel.

7. The method of claim 1, wherein the prescribed amount of time is between 0.1 and 10 minutes.

8. The method of claim 1, further comprising detecting a commercial program by using commercial program identification information included in the broadcast data and deleting broadcast data corresponding to the detected commercial program.

9. A digital broadcasting receiver, comprising:
    a control unit, registering a programmed channel, storing broadcast data received from the programmed channel as a programmed-recording program in accordance with a predetermined criterion, and storing a next programmed-recording program to replace the stored programmed-recording program if the programmed-recording program is completely stored and broadcast data corresponding to the next programmed-recording program is received;
    a storage unit, storing broadcast data corresponding to the programmed-recording program and channel information registered as the programmed channel; and
    a detection unit that detects a change in an event received in the broadcast data received from the programmed channel, to determine a time period for a gap between the change in the event in the programmed channel and a subsequent change in the event in the same programmed channel,
    wherein the control unit deletes broadcast data that corresponds to the gap when the time period is less than or equal to a prescribed amount of time, and
    wherein the event is a change in a title of content received in the broadcast data.

10. The digital broadcasting receiver of claim 9, wherein the predetermined criterion includes at least one broadcast program unit or at least one broadcast program unit, the programmed recording time of which is restricted.

11. The digital broadcasting receiver of claim 9, further comprising:

a user interface for allowing a user to select whether broadcast data stored as the programmed-recording program is to be played back from the beginning, and to change the channel for playback, wherein the control unit records or edits a portion of the broadcast data stored as the programmed-recording program corresponding to a point at which the channel is changed.

12. The digital broadcasting receiver of claim 11, wherein the user selects through the user interface whether to continue or stop recording the programmed-recording program, if the programmed-recording program is not played back from the beginning.

13. The digital broadcasting receiver of claim 11, wherein the control unit selects whether to continue or stop recording the programmed-recording program which is being played back on the programmed channel, if the programmed channel, on which the programmed-recording program is being played back, is changed to another channel.

14. The digital broadcasting receiver of claim 9, wherein the control unit cancels one or more channels of the programmed channel and registers another channel as the programmed channel.

15. The digital broadcasting receiver of claim 9, wherein the prescribed amount of time is between 0.1 and 10 minutes.

16. The digital broadcasting receiver of claim 9, wherein the control unit detects a commercial program by using commercial program identification information included in the broadcast data and deletes broadcast data corresponding to the detected commercial program.

17. A digital broadcasting receiver, comprising:

at least one tuner for tuning to a channel to receive broadcast data;

a storage device for storing the received broadcast data; and a controller for processing the broadcast data, wherein the controller is configured to detect a first event in the broadcast data, detect a second event in the broadcast data, wherein the first and second events in the broadcast data correspond to a change in a type of content, determine a time period between the first event and the second event in the broadcast data, and when the determined time period is less than or equal to a prescribed amount of time, delete a portion of the broadcast data that corresponds to the time period, and wherein the first or second events are a change in a display of an icon or text displayed in a prescribed area of the display.

18. The digital broadcasting receiver of claim 17, wherein the first event in the broadcast data corresponds to a start of a commercial in the broadcast data and the second event in the broadcast data corresponds to an end of the commercial in the broadcast data.

19. The digital broadcasting receiver of claim 17, wherein the prescribed amount of time is between 0.1 and 10 minutes.

20. A method of programming a recording in a digital broadcasting receiver, comprising:

registering a programmed channel among one or more channels;

storing broadcast data received from the programmed channel in a storage device as a programmed-recording program in accordance with a predetermined criterion;

storing a next programmed-recording program in a storage device to replace the stored programmed-recording program if the programmed-recording program is completely stored and broadcast data corresponding to the next programmed-recording program is received; and detecting graphic or text that is displayed on a particular area of a series of temporally-connected image frames and deleting broadcast data corresponding to a program that includes the graphic or the text, wherein the graphic or the text includes information of a program to follow.

21. A digital broadcasting receiver, comprising:

a control unit configured to register one or more channels as a programmed channel, store broadcast data received from the programmed channel as a programmed-recording program in accordance with a predetermined criterion, and store a next programmed-recording program to replace the stored programmed-recording program if the programmed-recording program is completely stored and broadcast data corresponding to the next programmed-recording program is received; and a storage unit that stores broadcast data corresponding to the programmed-recording program and channel information registered as the programmed channel, wherein the control unit controls to detect graphic or text that is displayed on a particular area of a series of temporally-connected image frames and delete broadcast data corresponding to a program that includes the graphic or the text, and wherein the graphic or the text includes information of a program to follow.

* * * * *